United States Patent
Aoki et al.

(10) Patent No.: US 10,311,684 B2
(45) Date of Patent: Jun. 4, 2019

(54) DISPLAY SYSTEM, DISPLAY DEVICE, AND DISPLAY METHOD

(71) Applicant: Seiko Epson Corporation, Tokyo (JP)

(72) Inventors: Shigeru Aoki, Shiojiri (JP); Naohiro Kaneko, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 222 days.

(21) Appl. No.: 14/518,833

(22) Filed: Oct. 20, 2014

(65) Prior Publication Data

US 2015/0109311 A1 Apr. 23, 2015

(30) Foreign Application Priority Data

Oct. 22, 2013 (JP) .................... 2013-218962
Oct. 22, 2013 (JP) .................... 2013-218963

(51) Int. Cl.
| | | |
|---|---|---|
| *G07G 1/14* | (2006.01) | |
| *H04L 29/08* | (2006.01) | |
| *G06F 3/14* | (2006.01) | |

(52) U.S. Cl.
CPC .............. *G07G 1/14* (2013.01); *H04L 67/02* (2013.01); *H04L 67/025* (2013.01); *H04L 67/08* (2013.01); *H04L 67/1095* (2013.01); *G06F 3/14* (2013.01); *G09G 2380/06* (2013.01)

(58) Field of Classification Search
None
See application file for complete search history.

(56) References Cited

U.S. PATENT DOCUMENTS

| 6,446,116 | B1 | 9/2002 | Burridge | |
|---|---|---|---|---|
| 2002/0015042 | A1* | 2/2002 | Robotham | G06F 3/14 345/581 |
| 2006/0233116 | A1* | 10/2006 | Kyusojin | H04L 43/0864 370/252 |
| 2010/0121942 | A1 | 5/2010 | Ooi et al. | |
| 2011/0283010 | A1* | 11/2011 | Parchman | H04N 21/23608 709/231 |
| 2012/0131124 | A1* | 5/2012 | Frey | G06F 15/16 709/212 |
| 2013/0229352 | A1 | 9/2013 | Tsutsumi | |
| 2013/0296048 | A1* | 11/2013 | Jeffery | A63F 13/12 463/31 |
| 2014/0307271 | A1* | 10/2014 | Suzuki | G06Q 20/0453 358/1.6 |

(Continued)

FOREIGN PATENT DOCUMENTS

| JP | 11-098138 A | 4/1999 |
|---|---|---|
| JP | 11-184813 A | 7/1999 |

(Continued)

*Primary Examiner* — Nurun N Flora
(74) *Attorney, Agent, or Firm* — Foley & Lardner LLP (57) ABSTRACT

The correlation between a device on the sending side and a device on the receiving side can be controlled with a high degree of freedom when sending and receiving data between multiple devices. A POS system 1 includes a host device 11 with a storage unit 25 having a data storage box 26 that stores data, and a transmission unit that sends data the data storage box 26 stores when data is stored in the data storage box 26; and a display tablet 102 that receives and displays data sent by the host device 11. The display panel 102*c* of the display tablet 102 is linked to the data storage box 26 of the storage unit 25 of the host device 11.

7 Claims, 6 Drawing Sheets (56) References Cited

U.S. PATENT DOCUMENTS

2016/0066246 A1* 3/2016 Green ................... H04W 40/02
                                                      455/411

FOREIGN PATENT DOCUMENTS

| JP | 2002-244960 A | 8/2002 |
| JP | 2002-342590 A | 11/2002 |
| JP | 2005-228270 A | 8/2005 |
| JP | 2007-156906 A | 6/2007 |
| JP | 2012-182744 A | 9/2012 |

* cited by examiner

DISPLAY SYSTEM, DISPLAY DEVICE, AND DISPLAY METHOD

CROSS-REFERENCE TO RELATED APPLICATION(S)

Priority is claimed under 35 U.S.C. § 119 to Japanese Application nos. 2013-218962, filed Oct. 22, 2013 and 2013-218963, filed Oct. 22, 2013, which are hereby incorporated by reference in their entirety.

BACKGROUND

1. Technical Field

The present invention relates to a display system, a display device, and a display method.

2. Related Art

Two-way communication using the WebSocket standard is one method of exchanging data between a plurality of devices as described in JP-A-2012-182744. Each time data is stored in the storage unit of the server in the configuration disclosed in JP-A-2012-182744, the server sends the data to a client device. Thus comprised, data can be transmitted without the client device requesting data from the server.

However, when data is transmitted without the device on the side that receives the data asserting a request for the data, it is not easy to determine which client device the data should be sent to because the receiving side does not request the data. As described in JP-A-2012-182744, the connection between the devices must therefore be simple, such as a 1:1 connection between the sending device and the receiving device. The operations that can be performed when the receiving device receives the data may also be limited.

SUMMARY

It is therefore an object of the present invention to enable, when communicating data between devices, controlling the relationship between the sending device and the receiving device with a high degree of freedom.

To achieve the foregoing object, a display system according to one aspect of the invention includes a first device including a storage unit having a storage area that stores data, and a transmission unit that transmits the data stored in the storage area when the data is stored in the storage area; and a second device including a communication unit that receives the data sent by the first device, and a display unit that displays the data received by the communication unit. The display unit of the second device is linked to the storage area of the storage unit of the first device.

By linking the storage display of the second device to a storage area of the first device, this configuration can control the correlation between the device on the side sending the data and the device on the side receiving the data with a high degree of freedom.

Preferably, the display system also has a third device that sends the data to the first device. The storage area of the storage unit of the first device is linked to the third device. The second device includes a reception process unit that displays the display data on the display unit when the data received by the communication unit is display data, and when the received data is acquisition data containing information related to acquiring the display data, acquires and displays the display data on the display unit based on the acquisition data. That is, the reception process unit acquires the display data in accordance with the acquisition data and displays said acquired display data By linking the third device to the storage area of the first device, this configuration can increase the degree of freedom in the correlation between devices when data is sent and received between multiple devices.

Further preferably, the display system also has a fourth device that sends the display data to the second device. The second device sends the acquisition data that is received by the communication unit to the fourth device; and the fourth device receives the acquisition data sent by the second device, and based on the acquisition data sends the display data to the second device.

This configuration enables the second device that receives data to acquire and display data from various devices.

Yet further preferably, the fourth device and the second device connect to a communication network; and the acquisition data includes the network address of the fourth device.

In this configuration, the second device that receives data can acquire and display data based on a network address.

Further preferably, the reception process unit of the second device acquires and displays the display data on the display unit based on the acquisition data at a preset time.

This configuration enables the second device to acquire and display data at a desired time.

In a display system according to another aspect of the invention, the display unit of the second device has a first display area and a second display area; the storage area of the first device is linked to the first display area of the display unit; and the reception process unit of the second device displays the display data in the first display area based on the data stored in the storage area of the first device.

This configuration enables linking a particular display area to the storage area.

In a display system according to another aspect of the invention, when data is stored in the storage area and second data that is different from the stored data is then (i.e. subsequently) stored in the storage area, the transmission unit of the first device transmits the second data. The reception process unit of the second device displays the second data on the display unit when the second data is display data, and when the second data is acquisition data including information related to acquiring the display data, acquires and displays the display data on the display unit based on the acquisition data.

This configuration can display data when the received data is display data and when the received data is acquisition data.

In a display system according to another aspect of the invention, the display unit of the second device has a first display area and a second display area; the storage area of the first device is linked to the first display area of the display unit; and when display data is stored in the storage area, the transmission unit of the first device sends the display data to the second device that has the first display area linked to the storage area.

This configuration can simplify sending data to a device that has a display unit.

Further preferably in a display system according to another aspect of the invention, the storage area of the first device stores unique information specific to the storage area (e.g. information identifying the storage area); and when display data is stored in the storage area, the transmission unit sends the display data and the unique information of the storage area to the second device.

This configuration enables the second device that receives data from the first device to identify the storage area of the first device.

Further preferably in a display system according to another aspect of the invention, the second device displays the display data in the first display area based on the unique information. In other words, the first display area for displaying the display data is determined on the basis of the unique information.

The second device that receives data in this configuration can display data corresponding to the storage area of the first device.

Further preferably, a display system according to another aspect of the invention also has a third device that sends the display data to the first device; and the first device receives and stores the display data sent by the third device in the storage area.

This configuration enables the second device to receive and display data from an external device other than the first device.

Another aspect of the invention relates to a display device including: a communication unit that receives data; a display unit; and a reception process unit that displays the display data on the display unit when the data received by the communication unit is display data, and when the received data is acquisition data containing information related to acquiring the display data, acquires and displays the display data on the display unit based on the acquisition data.

This configuration enables displaying data based on display data and acquisition data acquired from another device.

In a display device according to another aspect of the invention, the communication unit is connected to an external device that sends the display data, and sends the acquisition data received by the communication unit to the external device.

This configuration enables sending acquisition data to an external device, and acquiring and displaying data acquired therefrom.

In a display device according to another aspect of the invention, the communication unit is connected to a communication network including the external device; and the acquisition data includes the network address of the external device.

Thus comprised, the display device can acquire and display data based on a network address.

In a display device according to another aspect of the invention, the reception process unit acquires and displays the display data on the display unit based on the acquisition data at a preset time.

This configuration enables acquiring and displaying data at the desired time.

Another aspect of the invention relates to a display method, including: receiving data; displaying the display data on a display unit if the received data is display data; and, if the received data is acquisition data containing information related to acquiring the display data, acquiring the display data based on the acquisition data and displaying the acquired display data on the display unit.

This configuration enables displaying data based on display data and acquisition data acquired from another device.

A display method according to another aspect of the invention further includes connecting to an external device that transmits the display data, sending the acquisition data to the external device, and acquiring the display data.

This configuration enables sending acquisition data to an external device, and acquiring and displaying data acquired therefrom.

A display method according to another aspect of the invention further includes acquiring and displaying the display data on the display unit based on the acquisition data at a preset time.

This configuration enables acquiring and displaying data at the desired time.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
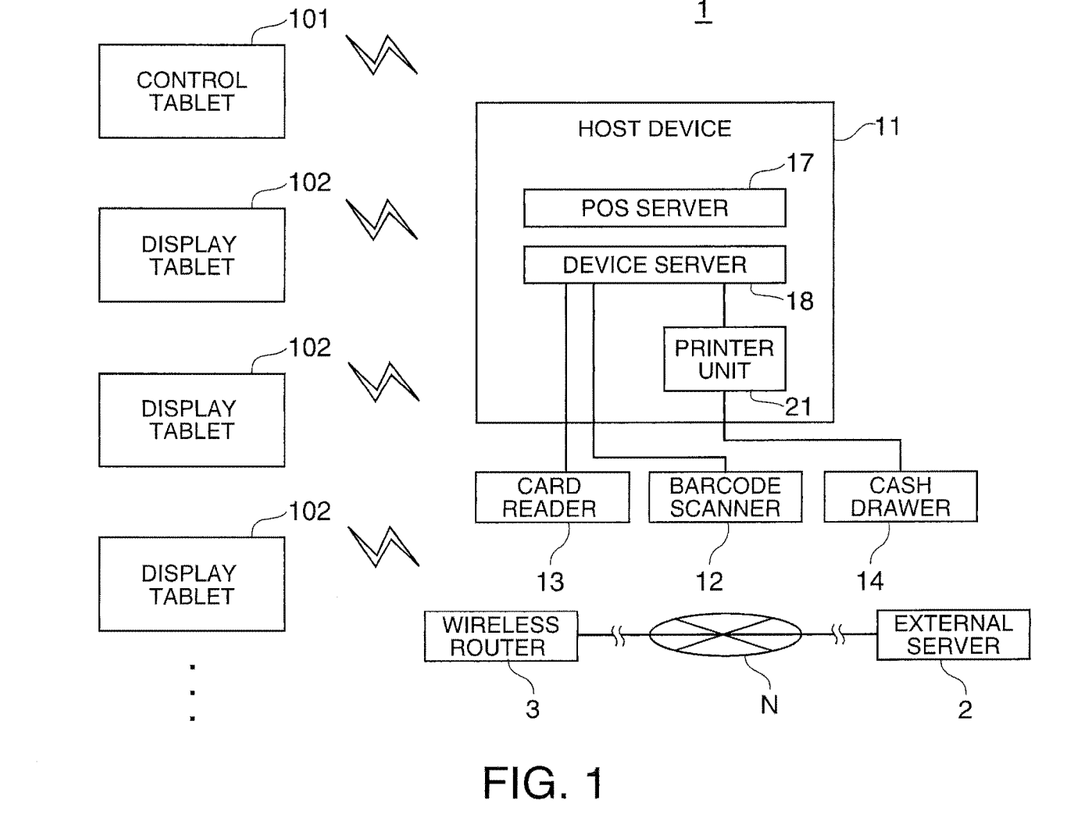
FIG. 1 is a block diagram showing an example of the configuration of a POS system according to a preferred embodiment of the invention.
Figure 2:
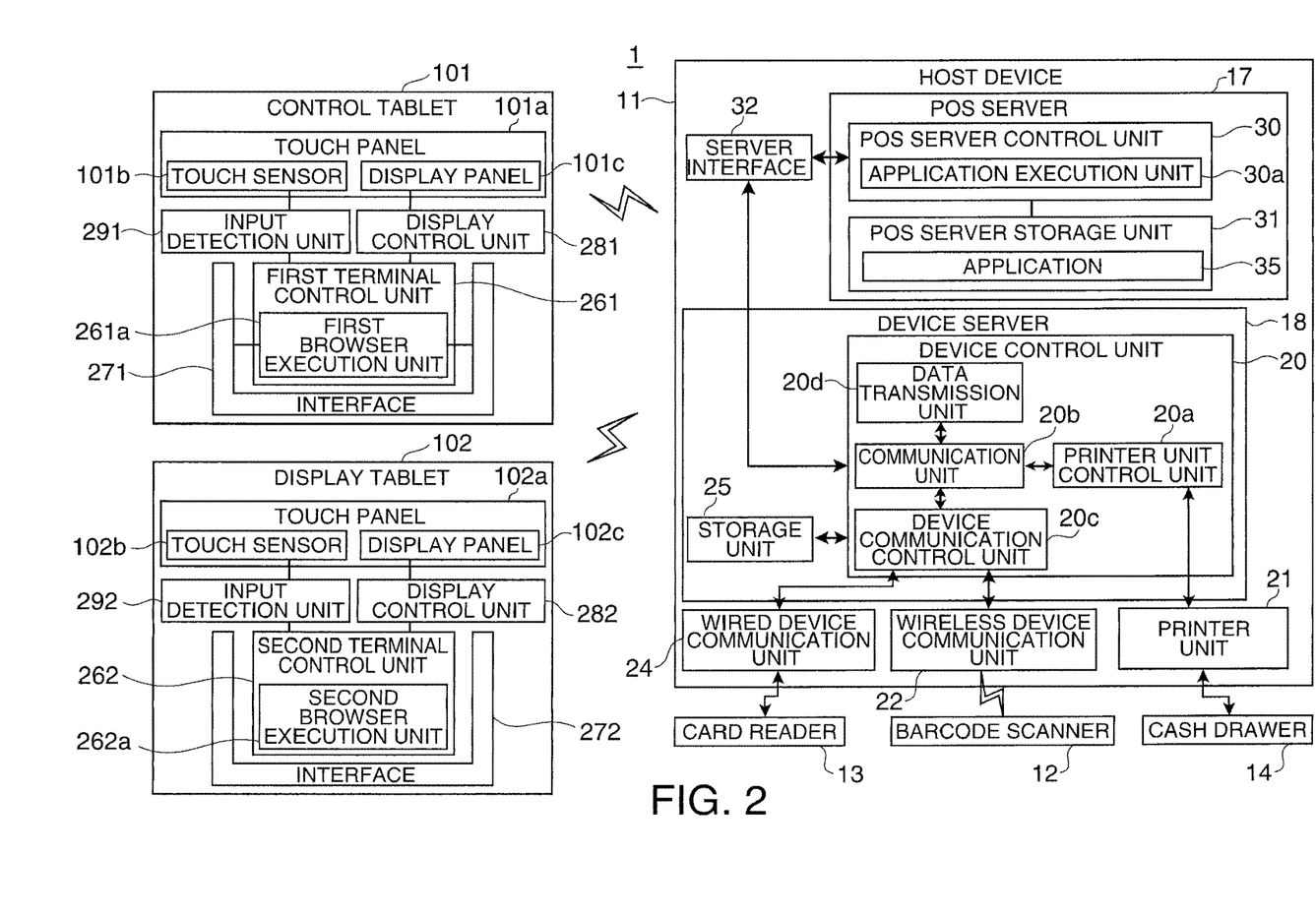
FIG. 2 is a block diagram exemplarily showing the functional configuration of the POS system.

FIG. 1 is a block diagram illustrating an example of the basic configuration of a POS (point-of -sale) system 1 (display system) according to this embodiment of the invention. FIG. 2 is a block diagram exemplarily illustrating the functional configuration of a control tablet 101, a display tablet 102, and a host device 11.

The POS system 1 executes a data process, to process product sales data in a store or other facility such as a retail store, restaurant or bar, or a service provider, for example. The data processes include, for example, registering products, calculating invoice amounts, transaction processes accompanying payment, issuing receipts showing the content of a transaction process, and providing information related to transaction processes. The POS system 1 manages product sales, product inventory, and sales information.

In one example, the POS system 1 is disposed in a retail store. The retail store has a plurality of checkout counters where transaction processes are completed. At least one host device 11 and a plurality of display tablets 102 are installed at each checkout counter.

In this embodiment the POS system 1 has a router 3, which may be a wireless router, for example. In the following, without intended limitation, reference will be made to a wireless router. The wireless router 3 transmits data wirelessly between the host device 11 (first device), the display tablet 102 (second device), and a control tablet 101 (third device). The wireless router 3 also communicates wirelessly with the control tablet 101, the display tablet 102, and the host device 11. Wireless data communication by the wireless router 3 is wireless data communication according to a specific standard, such as a wireless LAN standard. The wireless router 3 relays data communication between the foregoing devices.

The wireless router 3 connects to a communication network N. The communication network N may be a communication network including public communication networks or dedicated lines, for example. The communication network N may be an open network such as the Internet, or a closed network that can only be accessed by specific devices. An external server 2 (fourth device) also connects to the communication network N. The wireless router 3 relays data communications between the external server 2 and devices including the control tablet 101, the display tablet 102, and the host device 11.

The external server 2 supplies data in response to access from an external device. The external server 2 may be a server that broadcasts weather information, or a server that distributes advertising information, for example.

The display tablet 102 specifies a URL and accesses the external server 2 by HTTP as further described below. In this event, the external server 2 sends image data and text data corresponding to the specified URL to the display tablet 102. The display tablet 102 can thus acquire weather information or advertising information from the external server 2, for example.

The control tablet 101 and the display tablet 102 may be tablet computers. The control tablet 101 and display tablet 102 each have a touch panel with a display area on the front of the tablet. The operator responsible for transactions at the checkout counter can input data and commands by touching the touch panel.

The control tablet 101 is the terminal used by the operator. The display tablet 102 displays transaction information, such as the total transaction amount, for the customer at the checkout counter. More specifically, the display tablet 102 functions as a so-called customer display.

The host device 11 includes a POS server 17 and a device server 18. The POS server 17 operates as a server that manages the POS system 1, and runs processes such as supplying data to the control tablet 101.

One or more input devices are connected to the device server 18. For example, a barcode scanner 12 and a card reader 13 connect to the device server 18 as input devices. The barcode scanner 12 reads barcodes from products or product packaging, and outputs the read result to the device server 18. The card reader 13 reads credit cards and preferred customer cards, for example, and outputs the read result to the device server 18. The card reader 13 may be a device that reads magnetic information from magnetic stripe cards, or a device that reads and writes to IC cards. The barcode scanner 12 connects to the device server 18 by a near-field communication standard such as Bluetooth™, or the barcode scanner 12 may connect through a wired communication interface such as USB. The card reader 13 connects to the device server 18 through a wired communication interface such as USB.

The device server 18 acquires and sends the read result data input from the barcode scanner 12 and card reader 13 to the control tablet 101.

A cash drawer 14 and a printer unit 21 also connect to the device server 18. The printer unit 21 is housed in the host device 11.

The cash drawer 14 connects to the printer unit 21. The cash drawer 14 and printer unit 21 connect to the device server 18 in a daisy chain. As a result, when the device server 18 outputs an open drawer signal, the printer unit 21 relays the signal to the cash drawer 14 and the cash drawer 14 opens. The device server 18 controls the printer unit 21 to print receipts.

As shown in FIG. 2, the host device 11 has a server interface 32 that communicates with the control tablet 101 and the display tablet 102. The server interface 32 connects to the POS server 17 and the device server 18.

The server interface 32 has a specific network card or other communication interface. Operation of server interface 32 is controlled by the POS server control unit 30 of the POS server 17 and the device control unit 20 (control unit) of the device server 18. The server interface 32 sends and receives data according to a specific wireless communication protocol between the control tablet 101 and the display tablet 102. The POS server 17 and the device server 18 communicate with the control tablet 101 and the display tablet 102 through the server interface 32.

The device server 18 includes the device control unit 20, a printer unit 21 (print unit), a wireless device communication unit 22, a wired device communication unit 24, and a storage unit 25.

The device control unit 20 controls the device server 18, and includes a CPU, ROM, RAM, and other peripheral circuits (not shown in the figure).

The device control unit 20 includes a printer unit control unit 20a, a communication unit 20b (transmission unit), a device communication control unit 20c, and a data transmission unit 20d. These function blocks are embodied by the CPU of the device control unit 20 running a program, for example.

The printer unit control unit 20a runs programs related to controlling the printer unit 21, and controls the printer unit 21. The programs run by the device control unit 20 are created using a dedicated API (application programming interface) provided by the manufacturer of the host device 11, for example. The programs include, for example, a program for controlling the print functions of the printer unit 21, a communication control program, and a program controlling the operation of other devices.

The printer unit 21 includes a conveyance unit for conveying roll paper, a print unit that prints text and images on the roll paper by means of a thermal head, and a cutter that cuts the roll paper. Operation of printer unit 21 is controlled by the printer unit control unit 20a. Printer unit 21 prints receipt images on the roll paper. After printing, the printer unit 21 cuts the roll paper at a specific position and issues a receipt.

As described above, the cash drawer 14 is daisy chained to the printer unit 21. The printer unit control unit 20a connects to, and communicates with, the cash drawer 14 according to a specific serial communication protocol. The printer unit control unit 20a controls the cash drawer 14, and causes the cash drawer 14 to open, for example.

The communication unit 20b handles data communication with the control tablet 101 and the display tablet 102.

The communication unit 20b communicates with the first terminal control unit 261 through the server interface 32 and terminal interface 271, and acquires data sent by the first terminal control unit 261. The communication unit 20b also communicates with the server interface 32. The communication unit 20b sends data through the server interface 32 and the terminal interface 272 to the second terminal control unit 262. The data transmission unit 20d controls the communication operation of the communication unit 20b. The device communication control unit 20c executes a device control program to communicate with a device and control the device.

The data transmission unit 20d receives data from the control tablet 101, and passes the received data to the display tablet 102. The data transmission unit 20d uses a data storage box 26 (FIG. 3) rendered in the RAM of the device control unit 20 or the storage unit 25.

More specifically, when the communication unit 20b receives data from the control tablet 101, the data transmission unit 20d stores the received data in a data storage box 26 (storage area). The data transmission unit 20d sends the data newly stored in the data storage box 26 through the communication unit 20b to the display tablet 102.

In this operation the data transmission unit 20d selects or specifies the display tablet 102 corresponding to the data storage box 26 in order to select the destination of the transmitted data.

The wireless device communication unit 22 communicates wirelessly with the barcode scanner 12. The wireless device communication unit 22 communicates wirelessly using a near-field communication standard such as Bluetooth™, for example. More specifically, the wireless device communication unit 22 includes a link manager, a link controller, a high frequency circuit, and an antenna. The device communication control unit 20c reads and runs a Bluetooth driver stack to control Bluetooth hardware, for example. As a result, the device communication control unit 20c controls the wireless device communication unit 22 and communicates with the barcode scanner 12 by near-field communication using the Bluetooth standard.

The wired device communication unit 24 has a physical port such as a network interface card and a connector. The wired device communication unit 24 connects to the card reader 13 by wire according to a standard such as USB, and communicates with the card reader 13 according to a specific communication protocol. The device communication control unit 20c controls the wired device communication unit 24, and exchanges data and signals with the card reader 13.

The storage unit 25 includes a nonvolatile storage device such as a magnetic or optical storage medium or a semiconductor storage device. The CPU of the device control unit 20 has read/write access to storage unit 25, and storage unit 25 stores programs and data under control of the CPU of the device control unit 20.

The POS server 17 includes a POS server storage unit 31 that stores a database (not shown in the figure) storing product-related information, a database (not shown in the figure) for managing sales, and a database (not shown in the figure) for managing inventory. The POS server 17 uses these databases to manage the POS system 1.

The POS server 17 also has a POS server control unit 30 and POS server storage unit 31, and connects to the server interface 32.

The POS server control unit 30 includes a CPU, ROM, RAM, and other peripheral circuits not shown. The POS server control unit 30 controls the POS server 17. The CPU, ROM, RAM, and other peripheral circuits of the POS server control unit 30 may be the same as those of the device control unit 20.

The POS server storage unit 31 includes a nonvolatile storage device such as a magnetic or optical storage medium or a semiconductor storage device. The CPU has read/write access to the POS server storage unit 31, and it stores programs and data under control of the CPU. The POS server storage unit 31 and the storage unit 25 may be the same device.

The POS server storage unit 31 stores an application 35 so that the application 35 can be loaded. The printer unit control unit 20a reads and runs the application 35. As a result, the application execution unit 30a can execute processes alone, and can execute processes in conjunction with a first browser execution unit 261a. The application execution unit 30a generates data for web pages requested by the control tablet 101 or the display tablet 102. The application execution unit 30a may also read and send the data for the web pages requested by the control tablet 101 or the display tablet 102 from the POS server storage unit 31 to the device that sent the request. The display tablet 102 receives the web page data sent by the application execution unit 30a, and displays information in a window based on the received data. The window displayed by the display tablet 102 is further described below.

The control tablet 101 includes a first terminal control unit 261, a terminal interface 271, a display control unit 281, an input detection unit 291, and a touch panel 101a.

The touch panel 101a includes a display panel 101c and a touch sensor 101b. The display panel 101c is disposed to the front of the control tablet 101. The touch sensor 101b is disposed to the surface of the display panel 101c.

The display panel 101c may be an LCD panel, an OLED panel, e-paper, or other type of flat panel display. The display control unit 281 controls the display panel 101c.

The touch sensor 101b is a capacitive or pressure-sensitive sensor, detects touch operations by the user's finger, stylus, or similar device, and inputs a signal indicating the position where the touch operation was detected to the input detection unit 291.

The display control unit 281 drives the display panel 101c based on display image data input by the first browser execution unit 261a described below, and displays a window containing text or images on the display panel 101c.

The input detection unit 291 detects the touch operation on the touch panel 101a based on the signals output by the touch sensor 101b. When an operation is detected, the input detection unit 291 generates data indicating the operated position, and outputs to the first browser execution unit 261a. The data output by the input detection unit 291 is, for example, coordinate data expressing the position of the detected operation in coordinates corresponding to the display position on the display panel 101c.

The first terminal control unit 261 includes a CPU, ROM, RAM, and other peripheral circuits, and controls the control tablet 101. The first terminal control unit 261 includes a first browser execution unit 261a. The first browser execution unit 261a runs a browser program and renders a browser function that processes a web page. The first browser execution unit 261a receives a web page written in HTML or other markup language, or a scripting language, from the POS server 17. The first browser execution unit 261a generates display image data for the received web page, and outputs to the display control unit 281.

The first browser execution unit 261a also operates in conjunction with the application execution unit 30a to run a web application using scripts embedded on the web page. More specifically, the first browser execution unit 261a runs a web application provided by the application execution unit 30a, and processes data in conjunction with the application execution unit 30a. The control tablet 101 performs the operations of a POS terminal device using functions of the first browser execution unit 261a, or using functions of a web application run by the first browser execution unit 261a and application execution unit 30a.

When the touch sensor 101b detects a touch operation, the first browser execution unit 261a determines the input content of the touch operation. More specifically, the first browser execution unit 261a identifies the icon at the position that was touched based on the coordinate data input by the input detection unit 291 and the display image data output to the display control unit 281. As a result, the input content of the touch operation can be determined.

The first browser execution unit 261a sends data representing the identified input content to the application execution unit 30a. The application execution unit 30a then processes the data input by the first browser execution unit 261a, and sends the result to the first browser execution unit 261a. The first browser execution unit 261a then receives the process result sent by the application execution unit 30a, and generates and outputs display image data to the display control unit 281. The first browser execution unit 261a also runs the web application supplied by the data transmission unit 20d of the device server 18.

The first browser execution unit 261a runs a web application provided by the data transmission unit 20d. As a result of this operation, the first browser execution unit 261a can pass data through the device server 18 to the display tablet 102.

The terminal interface 271 is controlled by the first terminal control unit 261, and communicates with the device server 18 and the POS server 17 according to a specific wireless communication protocol.

Like the control tablet 101, the display tablet 102 includes a second terminal control unit 262, a terminal interface 272, a display control unit 282, an input detection unit 292, and a touch panel 102a. The terminal interface 272 (sending/receiving unit or communication unit) exchanges data with an external device such as the host device 11 and external server 2.

The touch panel 102a includes a display panel 102c (display unit) and a touch sensor 102b. The display panel 102c is disposed to the front of the display tablet 102. The touch sensor 102b is disposed to the surface of the display panel 102c.

The display panel 102c may be an LCD panel, an OLED panel, e-paper, or other type of flat panel display. The touch sensor 102b is a capacitive or pressure-sensitive sensor. The touch sensor 102b detects touch operations by the user's finger, stylus, or similar device, and outputs a signal indicating the position where the operation was detected to the input detection unit 292.

The display control unit 282 drives the display panel 102c, and displays text or images on the display panel 102c. The display control unit 282 drives the display panel 102c based on the display image data input by the second browser execution unit 262a (reception process unit).

The input detection unit 292 detects the touch operation on the touch panel 102a based on the signals output by the touch sensor 102b. When an operation is detected, the input detection unit 292 generates data indicating the operated position, and outputs to the second browser execution unit 262a. The data output by the input detection unit 292 is, for example, coordinate data expressing the position of the detected operation in coordinates corresponding to the display position on the display panel 102c.

The second terminal control unit 262 includes a CPU, ROM, RAM, and other peripheral circuits, not shown, and controls the display tablet 102. The second terminal control unit 262 includes a second browser execution unit 262a. The second browser execution unit 262a runs a browser program and renders a browser function that processes a web page.

When the touch panel 102a detects a touch operation, the second browser execution unit 262a determines the input content of the touch operation. More specifically, the second browser execution unit 262a identifies the icon at the position that was touched based on the coordinate data input by the input detection unit 292 and the display image data output to the display control unit 282. As a result, the input content of the touch operation can be determined.

The second browser execution unit 262a accesses the device server 18 through a function of the browser based on the detected input content. The second browser execution unit 262a downloads and stores in RAM (not shown in the figure), for example, data for a web page written in a markup language such as HTML, or a scripting language. The second browser execution unit 262a reads the downloaded web page data using a function of the browser, and generates and outputs display image data for the web page to the display control unit 282.

When data is received from the device server 18, the second browser execution unit 262a runs the web application supplied by the device control unit 20. The second browser execution unit 262a receives data from the device server 18 and processes the received data by a function of the web application. For example, the second browser execution unit 262a generates display image data for the text data or image data contained in the data received from the device server 18. The display data is text data or image data downloaded from the device server 18, or text data or image data obtained by processing downloaded data.

The second browser execution unit 262a can also acquire data from the external server 2 or other external device based on data received from the device server 18. For example, when the data received from the device server 18 is a URL (network address) for the external server 2, the second browser execution unit 262a may access the external server 2 by HTTP based on the URL. In this event, the external server 2 sends data including text data or image data in response to the HTTP access. The second browser execution unit 262a then receives the data from the external server 2, and generates the display image data.

The data the second browser execution unit 262a receives from the device server 18 may be data stored by the external server 2, or data for accessing data stored by the storage unit 25 of the host device 11, for example. This type of data is, for example, a path to a specific file stored by a storage device of an external device such as the external server 2, or stored by the storage unit 25 of the host device 11. This data may also contain the name of a network, the name of a computer on a network, the name or identification information of a storage device of a computer, the name or identification information of a directory or folder, or the name of a file in a particular directory or folder, for example. If the received data is a data path, the second browser execution unit 262a acquires the file or other object specified by the data path, and generates display image data to display the acquired data.

Note that data used by the second browser execution unit 262a to acquire data (data to be processed), such as the URL of the external server 2 or a path to data stored on the storage unit 25, is referred to as acquisition data.

When a URL or data path (corresponding to the acquisition data described above, referred to below as access information) is received from the device server 18, the second browser execution unit 262a acquires and displays data based on this data. The second browser execution unit 262a can then acquire data based on the same access information, and can update the display based on the acquired data. More specifically, after receiving a URL or data path and acquiring data based on the received access information, the second browser execution unit 262a continues to receive the data at a preset time based on the received access information.

While new access information is not received from the device server 18, the second browser execution unit 262a may receive data from the external server 2, for example, based on the access information at a preset time interval. In this event, the second browser execution unit 262a repeatedly acquires the data specified by the access information while new data is not received from the device server 18, i.e. during a time period in which new data is not received from the device server 18. When the second browser execution unit 262a receives the data specified by the access information, it generates display image data to display the received data. The second browser execution unit 262a outputs the generated display image data to the display control unit 282, and the display control unit 282 updates the display on the display panel 102c. As a result, the display on the display panel 102c is refreshed based on the access information.

When the second browser execution unit 262a receives new access information from the device server 18, the second browser execution unit 262a acquires data based on the new access information. For example, when a first URL is received as the access information, the second browser execution unit 262a receives data based on the first URL. The second browser execution unit 262a then receives the data specified by the first URL at a preset time. If a second URL is then sent from the same data storage box 26 as the first URL from the device server 18, the second browser execution unit 262a receives the second URL, replaces the first URL with the second URL, and the second browser execution unit 262a then receives data based on the second URL. The second browser execution unit 262a receives data based on the second URL. Next, the second browser execution unit 262a receives data from the second URL at a preset time. The second browser execution unit 262a can thus update the displayed data at a specific time interval when the access information is specified for the second browser execution unit 262a. The type of data acquired by the second browser execution unit 262a can also be changed by changing the access information.

Figure 3:
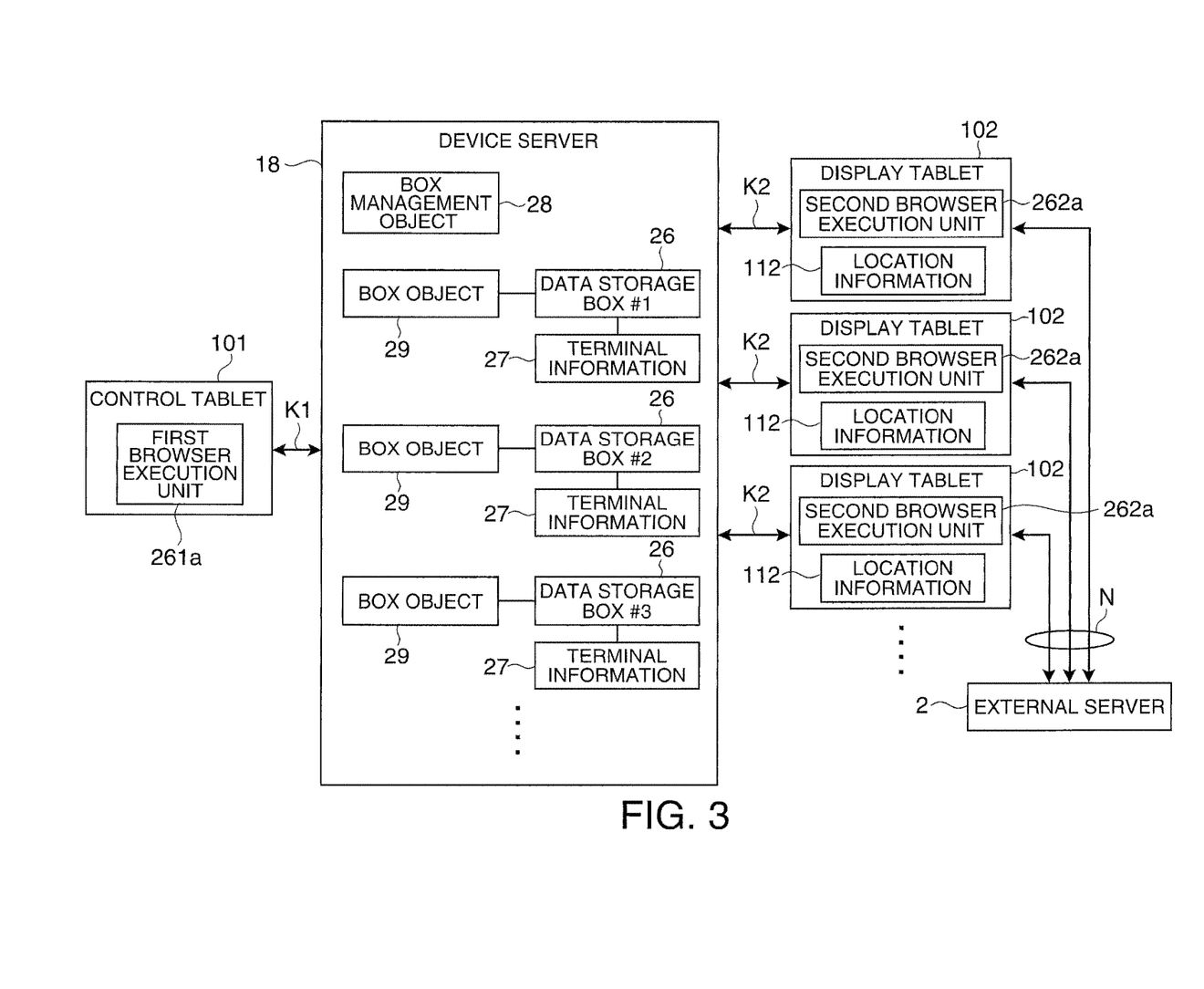
FIG. 3 exemplarily describes the data transmission operation in the POS system.

The second browser execution unit 262a determines the display format of data on the display panel 102c according to the location information 112 (FIG. 3). The display tablet 102 stores the location information 112 in ROM or RAM not shown.

The location information 112 is information specifying the display format, such as where the data is to be displayed on the display panel 102c, the display size, and the background color. For example, the location information 112 may be a web page written in HTML or other markup language. The location information 112 may also include information specifying the display format of text, including the character size, font, and text style, or information specifying the background.

As further described below with reference to FIG. 4B and FIG. 6, the second browser execution unit 262a displays information related to transactions processed by the POS system 1 based on (or according with) the location information 112. The location information 112 may therefore also include a script for acquiring data displayed in a particular display area, for example. More specifically, when displaying a window with data placed therein based on the location information 112, the second browser execution unit 262a can run a script contained in the location information 112 and update the displayed data.

The second browser execution unit 262a also has a function for displaying the new data in a display area specified by the location information 112, or refreshing data that is already displayed, when push data is received from the device server 18.

The second browser execution unit 262a determines the display format of data on the display panel 102c. The second browser execution unit 262a determines the data display format according to the location information 112 (display control information) of the display tablet 102.

FIG. 3 illustrates operation when sending and receiving data between the control tablet 101, the device server 18, and the display tablet 102. FIG. 3 shows the relationship between the communication unit 20b and the data transmission unit 20d of the device control unit 20, the first browser execution unit 261a of the control tablet 101, and the second browser execution unit 262a of the display tablet 102 appropriately to describing their operation.

In FIG. 3, the data storage box 26, box management object 28, and box object 29 are shown as function blocks of the device control unit 20 of the device server 18. A data storage box 26 is a storage area created in RAM of the device control unit 20 or the storage unit 25. The box management object 28 and the box objects 29 use the communication function of the communication unit 20b, and the ability of the data transmission unit 20d to control the communication unit 20b.

The terminal information 27 is information generated by the box management object 28, and is stored with the data storage box 26 in the storage unit 25 or RAM. This embodiment of the invention describes an example in which the data storage box 26 is rendered in the storage unit 25, and the storage unit 25 stores the terminal information 27.

The box management object 28 and box object 29 are objects generated by the device control unit 20. The box management object 28 and box object 29 include a method for processing the terminal information 27 and data stored in a data storage box 26, and a method for communicating with the control tablet 101 and display tablet 102.

When the POS system 1 boots up, or when the host device 11 has started and the first browser execution unit 261a starts operating, the first browser execution unit 261a and the application execution unit 30a run the web application described above. This web application establishes a first path K1, which is a communication path for sending and receiving data, between the first browser execution unit 261a and the device server 18.

The first browser execution unit 261a and the device server 18 open a connection using the WebSocket standard, and establish the first path K1, which is a software interface. The first path K1 is a WebSocket communication path that uses the Socket.io library, for example, but a different standard, such as Comet, may be used.

The web application operates the same way when the POS system 1 starts, or the second browser execution unit 262a starts operating after the host device 11 starts. The web application establishes a second path K2 between the second browser execution unit 262a and the communication unit 20b of the device server 18. Like the first path K1, the second path K2 is a communication path based on a connection opened using the WebSocket standard.

A data storage box 26 is a storage area created in the storage unit 25. The number of data storage boxes 26 that can be created, and the amount of data that can be stored in a data storage box 26, are predetermined. A data storage box 26 also has identification information. One data storage box 26 can be identified using this identification information. The control tablet 101 or the host device 11 specifies the identification information of a data storage box 26 when creating the data storage box 26. The values #1, #2, and #3 are assigned as the identification information to the three data storage boxes 26 in the example shown in FIG. 3.

A data storage box 26 is linked to a particular control tablet 101 and display tablet 102. Any number of control tablets 101 and display tablets 102 may be linked to one data storage box 26. One control tablet 101 may also be linked to a plurality of data storage boxes 26, and one display tablet 102 may also be linked to a plurality of data storage boxes 26.

The terminal information 27 is information linking a data storage box 26 to a control tablet 101 and a display tablet 102. The terminal information 27 includes the ID assigned to the first path K1 and second path K2, terminal name, or network address (such as an IP address or MAC address) of the terminal, for example, as information identifying the control tablet 101 and the display tablet 102.

In the following description, the process of linking a control tablet 101 and display tablet 102 to a data storage box 26 is referred to as "joining" the data storage box 26. The control tablet 101 and display tablet 102 linked to a data storage box 26 are also referred to as the control tablet 101 and display tablet 102 that joined the data storage box 26.

The box management object 28 manages the data storage boxes 26, terminal information 27, and box objects 29. The box management object 28 runs a process related to creating and deleting data storage boxes 26, terminal information 27, and box objects 29. The box management object 28 also creates a data storage box 26 in response to a request from the first browser execution unit 261a or the second browser execution unit 262a, and creates terminal information 27 and a box object 29 appropriate to the data storage box 26 that was created. A box object 29 is therefore created for each data storage box 26 as shown in FIG. 3.

The control tablet 101 can send data to a data storage box 26 linked to the control tablet 101. The control tablet 101 specifies the identification information of the data storage box 26 when sending data.

The box management object 28 then calls the box object 29 corresponding to the data storage box 26 of the specified identification information. The called box object 29 receives and stores the data in the data storage box 26. The box object 29 references the terminal information 27 corresponding to the data storage box 26 that stored the data. The box object 29 then sends the data stored in the data storage box 26 to the display tablet 102 that is linked to the data storage box 26 by the terminal information 27. As a result, data can be sent to the display tablet 102 set in the terminal information 27 without the control tablet 101 specifying the display tablet 102 that is the intended destination.

The control tablet 101 can also specify the intended display tablet 102 when sending data. In this event, the box object 29 sends the data to the specified display tablet 102. However, if the display tablet 102 specified by the control tablet 101 does not correspond to the data storage box 26 specified by the control tablet 101, data is not transmitted. In addition, if the data storage box 26 specified by the control tablet 101 does not correspond to the control tablet 101, the data is not stored in the data storage box 26.

When sending data stored in the data storage box 26 to the display tablet 102, the box object 29 adds data representing the identification information (unique information) of the data storage box 26. The second browser execution unit 262a can identify the data storage box 26 that stored the data when it receives data.

When the second browser execution unit 262a receives data through the second path K2, it generates display image data to display the received data and outputs to the display control unit 282.

As described above, the second browser execution unit 262a determines the display format of received data according to the location information 112.

The location information 112 includes information specifying the display format, such as where the data is to be displayed on the display panel 102c, the display size, and the background color, and may be a web page written in HTML or other markup language.

The location information 112 includes information specifying the data display format linked to the identification information of the data storage box 26 that stores the data the display tablet 102 received. The second browser execution unit 262a generates display image data for displaying the data sent by the box object 29 in a display format corresponding to the identification information of the data storage box 26 sent by the box object 29.

All or part of the information contained in the location information 112 may be previously stored by the device server 18 and sent to the display tablet 102. The control tablet 101 may also send the location information 112 to the device server 18, and the device server 18 may send the location information 112 to the display tablet 102.

When the device server 18 stores the location information 112 in the storage unit 25, the box object 29 may send the data stored by the data storage box 26 and the location information 112 related to that data storage box 26 to the display tablet 102. Alternatively, the box object 29 may send the data stored by the data storage box 26 and data about the display format of the data to the display tablet 102. In this event, even if the display tablet 102 does not store the location information 112, the second browser execution unit 262a can determine the display format based on the data sent by the box object 29.

The method whereby the device server 18 sends data to the display tablet 102 is not limited to push transmission. For example, the display tablet 102 may access the data storage box 26 at a preset time interval to receive data. Further alternatively, a storage area synchronized with the data storage box 26 may be disposed to the display tablet 102, and the box object 29 may apply control that synchronizes the data stored in the storage area of the display tablet 102 and the data storage box 26.

When null data or a command to delete displayed data is contained in the received data, the second browser execution unit 262a generates and outputs blank display image data to the display control unit 282. As a result, the display on the display tablet 102 can be controlled by the first browser execution unit 261a sending a command or null data.

Figure 4A:
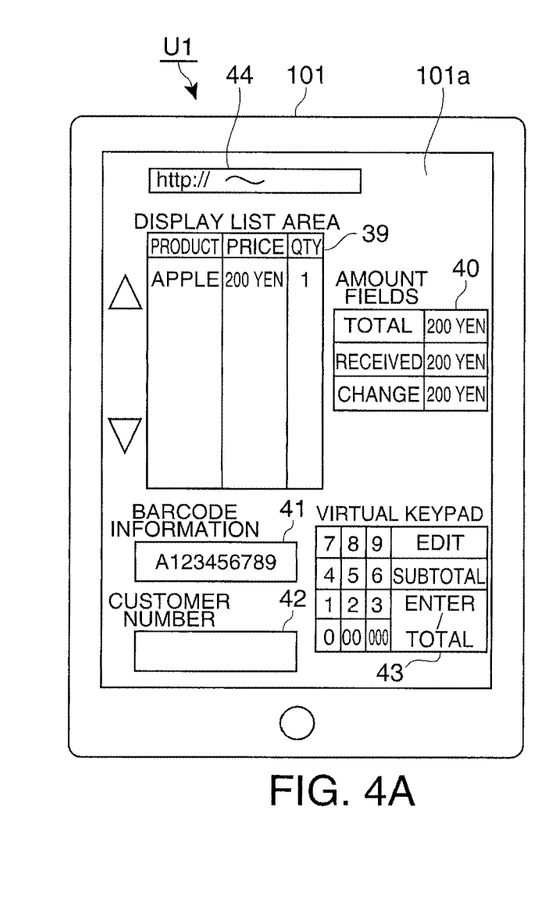
FIGS. 4A and 4B illustrate examples of displays presented on a control tablet and a display tablet.
Figure 4B:
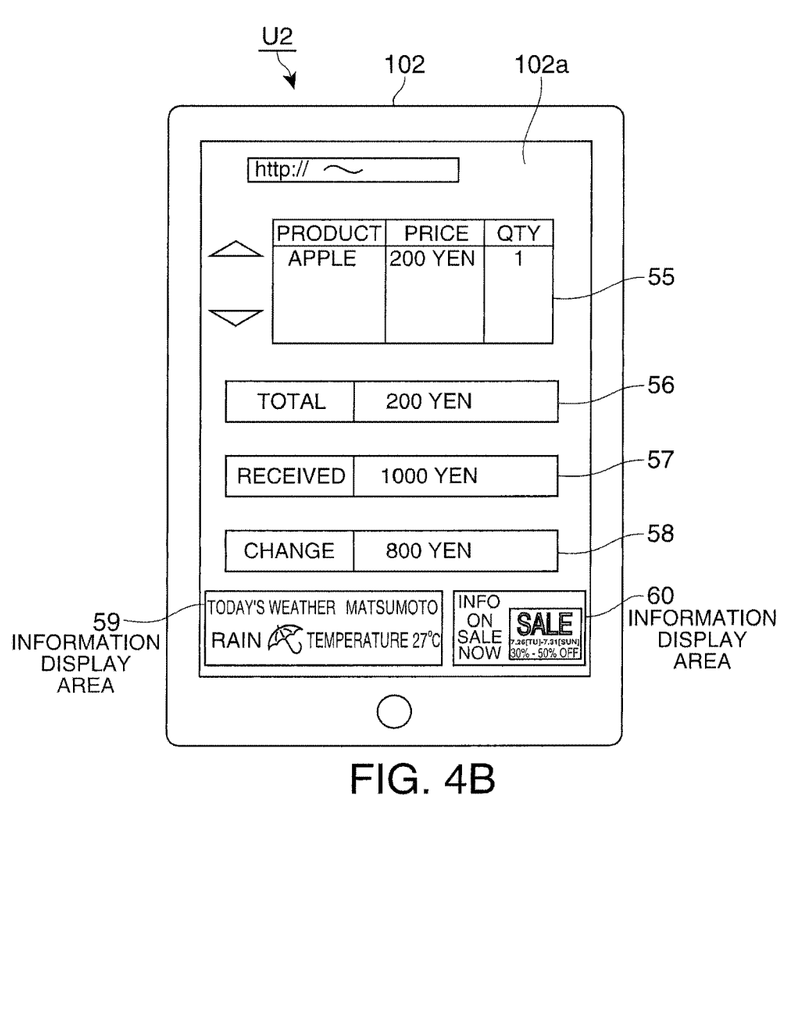

FIGS. 4A and 4B show examples of displays presented on the control tablet 101 and display tablet 102. FIG. 4A shows a sample of a display on the touch panel 101a of the control tablet 101, and FIG. 4B shows a sample of the display on the display panel 102c of the display tablet 102.

The first user interface U1 shown in FIG. 4A is a screen displayed by the touch panel 101a when the operator operates the control tablet 101 to perform a transaction process. A display list area 39, amount fields 40, a barcode data field 41, a customer number field 42, and a virtual keypad 43 are included in the first user interface U1.

Product names, prices, and quantities are listed in the display list area 39. The total purchase amount, the amount of money received from the customer, and the amount of change due to the customer are displayed in the amount fields 40. The barcode data field 41 displays the barcode information read by the barcode scanner 12. The customer number field 42 displays a preferred customer number, for example, that was captured by reading a preferred customer card with the card reader 13. The virtual keypad 43 is used by the operator to input values to the input fields of the first user interface U1.

The second user interface U2 shown in FIG. 4B is the screen displayed by the display panel 102c when the POS system 1 executes the transaction process. The second user interface U2 includes a product display list area 55, a transaction total display area 56, an amount-received display area 57, and a change-due display area 58.

The product display list area 55 displays the same data displayed in the display list area 39 of the first user interface U1. The transaction total display area 56, amount-received display area 57, and change-due display area 58 display the same data as the amount fields 40.

The control tablet 101 sends the data displayed in these display areas to the data storage box 26, and the box object 29 sends (passes) the data from the data storage box 26 to the display tablet 102.

The second user interface U2 also has an information display area 59 and an information display area 60. One information display area 59 displays weather information the second browser execution unit 262a acquired from the external server 2 (FIG. 3) as described above. The other information display area 60 displays advertising information acquired by the second browser execution unit 262a from the external server 2.

The display tablet 102 receives the data presented in the second user interface U2 from the data storage box 26. More specifically, the product display list area 55, the transaction total display area 56, the amount-received display area 57, the change-due display area 58, the information display area 59, and the information display area 60 each operate as a display area of the display panel 102c. These display areas are linked to respective data storage boxes 26 as described below.

For example, the product display list area 55 is linked to data storage box (26) #1, the transaction total display area 56 is linked to data storage box (26) #2, and the amount-received display area 57 is linked to data storage box (26) #3. The change-due display area 58 is linked to data storage box (26) #4.

In addition, the information display area 59 is linked to data storage box (26) #5, and the information display area 60 is linked to data storage box (26) #6. The information display area 59 and information display area 60 display the data the display tablet 102 acquires based on the data stored by the data storage boxes (26) #5 and #6. Note that data storage boxes (26) #4 to #6 are not shown in the figures, but are disposed in the storage unit 25.

The display list area 39 and the amount fields 40, which are display areas in the first user interface U1, are also linked to respective data storage boxes 26. The first browser execution unit 261a sends the data displayed in the display list area 39, that is, the names, prices, and quantities of the products purchased by the customer, to data storage box (26) #1. This operation is an operation that sends the data to the host device 11 addressed to the data storage box (26) #1. Of the data displayed in the amount fields 40, the first browser execution unit 261a sends the total purchase amount data for the products purchased by the customer to data storage box (26) #2, and sends data of the amount received from the customer for the transaction to data storage box (26) #3. Of the data displayed in the amount fields 40, the first browser execution unit 261a sends data for the amount of change due to the customer to data storage box (26) #4. That is, the first browser execution unit 261a sends data displayed in a given display area to a corresponding data storage box 26, which is a data storage box 26 linked to the given display area. The respective data storage boxes 26 send the data received from the first browser execution unit 261a to store to the display tablet 102.

For example, if the control tablet 101 sends the data displayed in the display list area 39 to data storage box (26) #1, the display tablet 102 receives the data from data storage box (26) #1. When the control tablet 101 sends the data displayed in the amount fields 40 to data storage box (26) #2, the display tablet 102 receives the data from data storage box (26) #2. When the control tablet 101 sends a URL to acquire weather information to data storage box (26) #5, the display tablet 102 receives the data from data storage box (26) #5.

The second browser execution unit 262a displays the data received from data storage box (26) #1 in the product display list area 55. As a result, product display list area 55 displays the data displayed in display list area 39. Likewise, the second browser execution unit 262a respectively displays the data received from data storage boxes (26) #2, #3, and #4 in the transaction total display area 56, the amount-received display area 57, and the change-due display area 58, respectively. That is, the second browser execution unit 262a displays the data received from a given data storage box 26 in a corresponding display area, which is a display area linked to the given data storage box 26. As a result of this operation, the values related to the transaction amounts input by the control tablet 101 are quickly displayed by the display tablet 102.

The data stored by data storage boxes (26) #5 and #6 is data enabling the display tablet 102 to acquire data, such as a URL. In this example, data storage box (26) #5 stores the URL through which the external server 2 supplies weather information, and data storage box (26) #6 stores the URL through which the external server 2 supplies advertising information.

When the second browser execution unit 262a receives data from data storage box (26) #5, it accesses the external server 2 based on this data and acquires the weather information. The second browser execution unit 262a then displays the acquired weather information in the information display area 59 linked to the data storage box (26) #5 that sent the data. Likewise when data is received from the data storage box (26) #6, the second browser execution unit 262a accesses the external server 2 based on that data and acquires the advertising information. The second browser execution unit 262a displays the acquired advertising information in the information display area 59 linked to the data storage box (26) #6 that sent the data. The second browser execution unit 262a can thus acquire and display different data (weather information and advertising information in this example) using access information for plural locations.

The second browser execution unit 262a saves the access information for acquiring weather information as data received from the data storage box (26) #5. The second browser execution unit 262a also saves the access information for acquiring advertising information as data received from the data storage box (26) #6. As a result, access information for plural locations can be separately managed, and the access information can be used to acquire different types of data.

The weather information in the information display area 59 and the advertising information in the information display area 60 are updated when the second browser execution unit 262a receives new data, and new information is acquired from the external server 2 based on the received data.

When the data received from the data storage box (26) #5 is a URL, the second browser execution unit 262a accesses the external server 2 using the received URL and receives the weather information. Next, the second browser execution unit 262a executes an operation to receive weather information from the same URL at a preset time or at a preset time interval. As a result, when the data storage box (26) #5 stores a URL, the second browser execution unit 262a updates the weather information displayed in the information display area 59 based on the stored URL at a specific interval. The second browser execution unit 262a can update the weather information in the information display area 59 even if new data is not stored in the data storage box (26) #5.

When the control tablet 101 specifies data storage box (26) #5 and sends a new URL, and the data storage box (26) #5 stores the new URL, the display tablet 102 receives this new URL. The second browser execution unit 262a then replaces the previously received URL with the new URL received from the data storage box (26) #5.

The advertising information the display tablet 102 displays in the information display area 60 is updated in the same way. More specifically, when the second browser execution unit 262a receives the URL for advertising information from the data storage box (26) #6, it receives the advertising information based on the received URL and displays the advertising information in the information display area 60. When a different URL is then received from the data storage box (26) #6, the second browser execution unit 262a displays the data acquired based on the newly received URL in the information display area 60.

In this example the location information 112 links the data storage box 26 identification information (#1 to #3) to particular areas (display areas) as shown in FIG. 4B. Based on this location information 112, the display tablet 102 displays the data received from data storage box (26) #1 to data storage box (26) #3 in the appropriate areas of the second user interface U2. The location information 112 also specifies the display format, such as the display size and color, of the data in the display areas.

Figure 5:
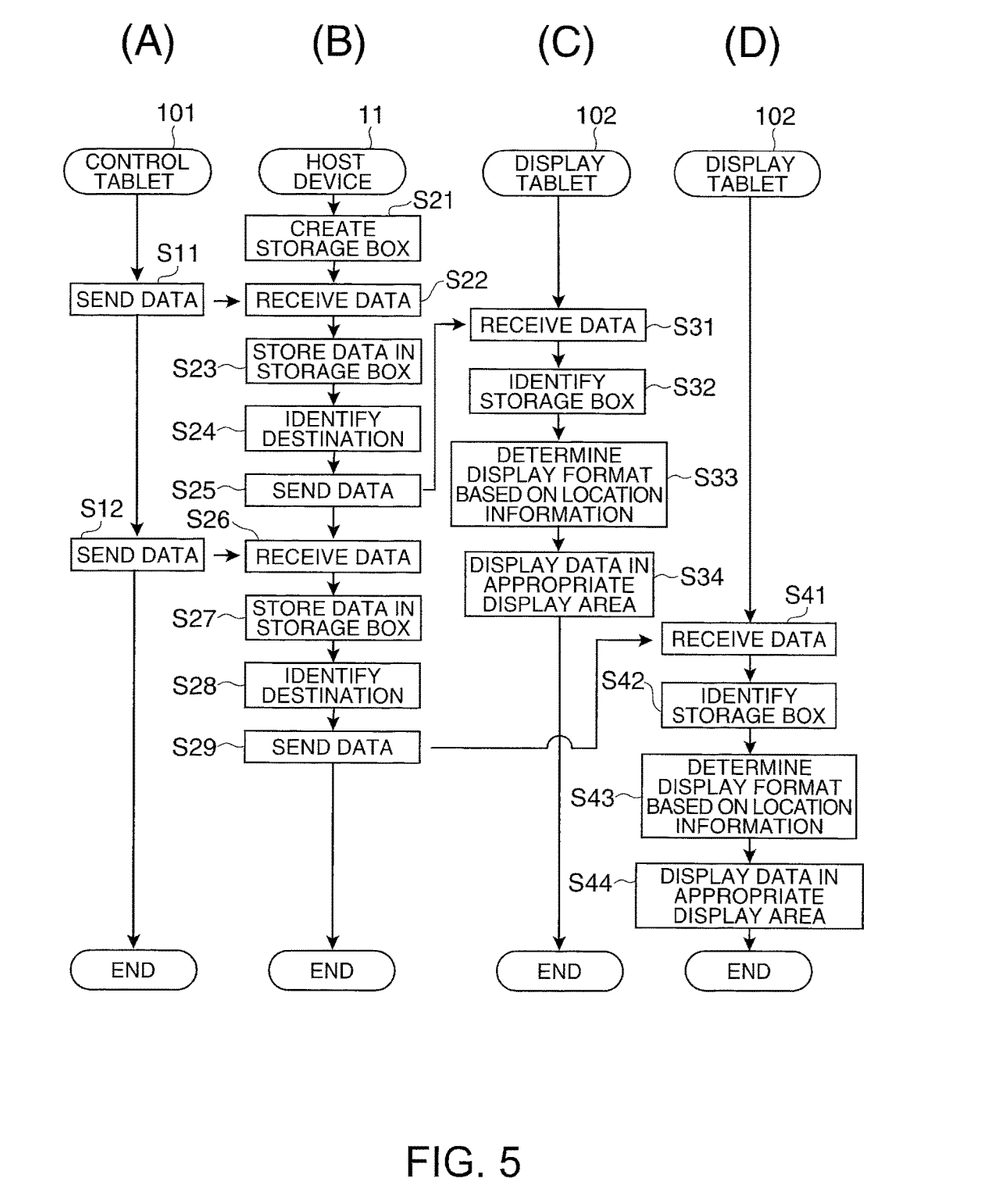
FIG. 5 is a flow chart exemplarily illustrating the operation of devices in the POS system.

FIG. 5 is a sequence diagram of the operation of the POS system 1. The operation whereby the display tablet 102 receives data sent by the control tablet 101 through a data storage box 26, and the operation whereby the display tablet 102 displays the received data, are shown in FIG. 5.

Before data communication starts, the host device 11 creates a data storage box (26) as controlled by the box management object 28 (step S21). In the example shown in FIG. 5, a plurality of data storage boxes 26 are created in step S21. A control tablet 101 and one display tablet 102 are linked to one data storage box 26 by the terminal information 27. The control tablet 101 and a different display tablet 102 are linked to another data storage box 26.

When the control tablet 101 sends data to a data storage box 26 as instructed by the operator (step S11), the box object 29 corresponding to the data storage box 26 specified by the control tablet 101 receives the data (step S22). The box object 29 stores the data (display data) in the data storage box 26 (step S23), and identifies the display tablet 102 linked to the data storage box 26 based on the terminal information 27 (step S24). The box object 29 sends the data (display data) stored in the data storage box 26 and data representing the identification information (unique information) of the data storage box 26 to the specified display tablet 102 (step S25).

The second browser execution unit 262a of the display tablet 102 shown in column (C) of FIG. 5 receives the data (display data) sent by the control tablet 101 (step S31). The second browser execution unit 262a then identifies from which data storage box 26 the data came based on the data storage box 26 identification information included in the received data (step S32). The second browser execution unit 262a gets the display format linked to the identified data storage box 26 based on the location information 112, and determines the display format of the data (step S33). The display format determined in step S33 includes the display area in the second user interface U2 and the display size as described above. The second browser execution unit 262a generates display image data for displaying the data according to the identified display format, outputs to the display control unit 282, and the display control unit 282 then displays the data on the display panel 102c (step S34).

When the control tablet 101 sends data specifying a different data storage box 26 (step S12), the box object 29 linked to the specified data storage box 26 receives the data (step S26). The box object 29 stores the data in the data storage box 26 (step S27), and determines the display tablet 102 linked to this data storage box 26 based on the terminal information 27 (step S28). The box object 29 sends the data stored in the data storage box 26 and data indicating the identification information of the data storage box 26 to the identified display tablet 102 (step S29).

The second browser execution unit 262a of the display tablet 102 shown in column (D) of FIG. 5 receives the data sent by the control tablet 101 (step S41). In steps S42 to S44, the second browser execution unit 262a then executes the same operation described in steps S32 to S34. As a result, the display tablet 102 displays data on the display panel 102c in the display area linked to the data storage box 26.

Figure 6:
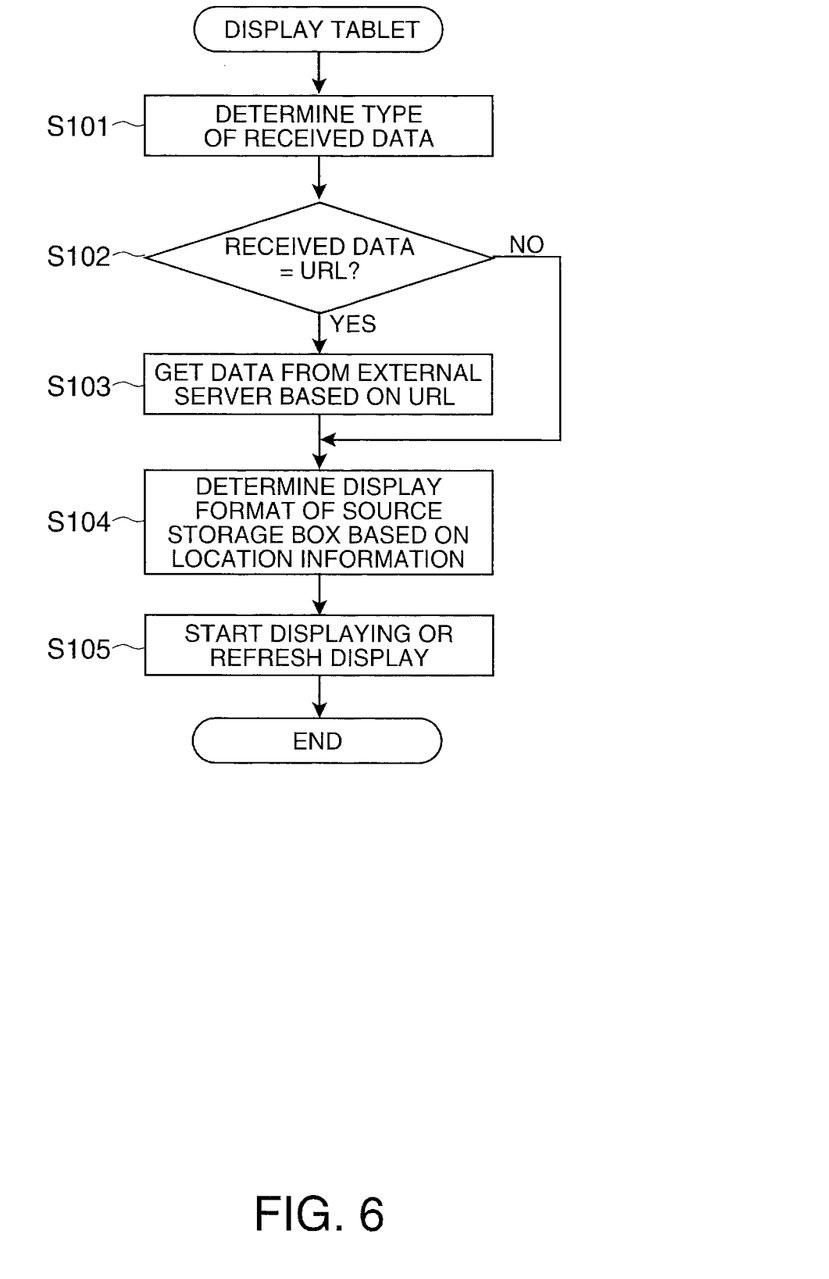
FIG. 6 is a flow chart exemplarily illustrating the operation of the display tablet.

FIG. 6 is a flow chart of the operation of the display tablet 102, and describes the operation of the display tablet 102 when receiving and displaying data.

The second browser execution unit 262a receives the data pushed by the host device 11 and determines the type of data (step S101). There are two data types (attributes), data to be displayed on the display panel 102c (display data), and access information (acquisition data) for acquiring data to display on the display panel 102c.

When the received data is text data, for example, the second browser execution unit 262a interprets the data and determines if the received data is a URL or data other than a URL (step S102). If the received data has a format unique to a URL, such as text data starting with a protocol name such as http, https, or ftp, the second browser execution unit 262a identifies the data as a URL. The second browser execution unit 262a may also determine the type of data based on the identification information of the originating data storage box 26, or the identification information of the originating control tablet 101.

When the received data is determined to be a URL (step S102 returns YES), the second browser execution unit 262a accesses an external device such as the external server 2 based on the URL, acquires data (step S103), and proceeds to step S104. If the received data is determined to not be a URL (step S102 returns NO), the second browser execution unit 262a skips to step S104.

In step S104, the second browser execution unit 262a determines the display format of the received data based on the location information 112. The second browser execution unit 262a determines the display size of the data, the display color, and the background color, for example, according to the location information 112. The second browser execution unit 262a also determines the display area linked to the identification information of the originating data storage box 26 according to the location information 112.

The second browser execution unit 262a displays the data received in step S101 or the data acquired in step S103 on the display panel 102c, or updates the data already being displayed, according to the display format determined in step S104 (step S105).

After step S103, the second browser execution unit 262a regularly accesses the external server 2 and acquires data based on the received URL, and based on the acquired data continues the operation of updating the display on the display panel 102c. This operation sends null data to the data storage box 26 with identification information identical to the URL, and stops when the access information the second browser execution unit 262a uses is replaced with null data. More specifically, updating the display on the display tablet 102 can be stopped by the control tablet 101 sending null data.

As described above, the POS system 1 according to this embodiment has a host device 11 and a display tablet 102. The host device 11 has a storage unit 25 with a data storage box 26 that stores data, and a server interface 32 that sends the data stored by the data storage box 26 when the data storage box 26 stores data.

The display tablet 102 has a terminal interface 272 that receives data sent by the host device 11, and a display panel 102c that displays the data received by the terminal interface 272. The display panel 102c of the display tablet 102 is linked to a data storage box 26 created in the storage unit 25 of the host device 11. Because the data storage box 26 is linked to a particular display tablet 102, data can be easily sent from the data storage box 26 to the display tablet 102. Furthermore, by linking the data storage box 26 to a particular display tablet 102, the correlation between the device on the side that sends the data and the device on the side receiving the data can be controlled with a high degree of freedom.

The POS system 1 also has a control tablet 101 that sends data to the host device 11. A data storage box 26 created in the storage unit 25 of the host device 11 is also linked to the control tablet 101. The display tablet 102 also has a second browser execution unit 262a. When the data received by the terminal interface 272 is display data, the second browser execution unit 262a presents the display data on the display panel 102c. When the received data is acquisition data including information related to acquiring display data, the second browser execution unit 262a acquires the display data based on the acquisition data and displays the data on the display panel 102c. As a result, devices can be correlated with a greater degree of freedom when data is sent and received between a plurality of devices in a POS system 1.

A POS system 1 according to the invention also includes an external server 2 that sends display data to the display tablets 102. The display tablet 102 sends acquisition data to the external server 2, and the external server 2 receives the acquisition data sent by the display tablet 102 and sends display data based on the acquisition data to the display tablet 102. As a result, the display tablet 102 that receives the data can acquire and display data from different devices.

In this POS system 1 the external server 2 and the display tablet 102 connect to a communication network N, and the acquisition data includes the network address of the external server 2. The display tablet 102 that receives data can therefore acquire and display data based on a network address.

The second browser execution unit 262a can also acquire display data based on acquisition data at a preset time, and display the data on the display panel 102c. The display tablet 102 can therefore acquire and display data at the desired time.

The display panel 102c of the display tablet 102 also has display areas such as a product display list area 55, a transaction total display area 56, an amount-received display area 57, and a change-due display area 58. The data storage boxes 26 of the host device 11 are linked to specific display areas on the display panel 102c. The second browser execution unit 262a displays the display data in the corresponding display area of the display panel 102c based on data stored in the data storage box 26 of the host device 11. As a result, data can be quickly received from the data storage box 26 and displayed in a defined display area.

When display data is stored in the data storage box 26, the server interface 32 of the host device 11 can send the display data to the display tablet 102 with a display area corresponding to the data storage box 26.

When data is stored in a data storage box 26 and different data (second data) is then stored in the data storage box 26, the server interface 32 of the host device 11 transmits the second data. When the second data is display data, the second browser execution unit 262a displays the data on the display panel 102c; when the second data is acquisition data containing information related to acquiring display data, the second browser execution unit 262a acquires the display data based on the acquisition data and displays the display data on the display panel 102c. As a result, data can be displayed regardless of whether the received data is display data or acquisition data.

Each data storage box 26 stores unique information specific to itself, and when display data is stored in the data storage box 26, the server interface 32 sends the display data and the unique information of the data storage box 26 to the display tablet 102. As a result, the display tablet 102 that receives data from the host device 11 can identify a particular data storage box 26 of the host device 11.

The display tablet 102 may also show display data in a first display area based on the unique information. In this event, the display tablet 102 can display the data appropriately to the data storage box 26 of the host device 11.

The invention is described above with reference to a preferred embodiment thereof, but the invention is not limited thereto and can be modified and adapted in many ways without departing from the scope of the accompanying claims.

For example, the foregoing embodiment describes an example in which the device to which the device control unit 20 sends the data stored in the data storage box 26 is the display tablet 102, but the invention is not so limited. For example, the device to which the device control unit 20 sends data may be a printer or a device that only has a display capability. In this event, the function unit that sends a command in response to user operation may be a separately provided device.

In the embodiment described above, a display tablet 102 is used as an example of a device that outputs data. In this configuration, the communication unit 20b of the device control unit 20 sends data stored in a data storage box 26 to the display tablet 102 by push transmission. But the invention is not so limited, and the output device may be the printer unit 21, or an external printer. More specifically, the device control unit 20 may push data to the printer unit 21 or to another printer by means of the box object 29. In this event, the printer unit 21 or the other printer that received the data may arrange and print the data based on preset information. In addition, a function unit that sends commands in response to user operation may be a separate device.

The host device 11 is described in the foregoing embodiment as configured to render the functions of a POS server 17 and a device server 18, but the POS server 17 and the device server 18 may be separate devices. Of the functions of the communication unit 20b and the data transmission unit 20d, the POS server 17 may execute the function of storing data acquired from the control tablet 101 or other external device in a data storage box 26 and pushing data to the display tablet 102. This function may further alternatively be executed by a device other than the host device 11.

The function blocks shown in FIG. 2 can be achieved by a desirable combination of hardware and software, and do not suggest a specific hardware configuration. The operations described above may also be achieved by the devices executing a program stored by an external storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A point-of-sale (POS) system comprising:
a POS terminal configured to process an account;
a host device configured to receive, from the POS terminal, first data related to account processing and second data not related to the account processing; and
a display configured to receive the first data and the second data from the host device, wherein:
the POS terminal comprises a second display and is configured to display the first data on the second display, designate first unique information, transmit the first data and the first unique information to the host device, designate second unique information, and transmit the second data and the second unique information to the host device,
the host device is configured to store the first data in a first storage area associated with the first unique information and send the first data and the first unique information to the display by push transmission responsive to receiving the first data and the first unique information from the POS terminal, and store the second data in a second storage area associated with the second unique information and send the second data and the second unique information to the display by push transmission responsive to receiving the second data and the second unique information from the POS terminal, and
the display comprises a first display and a second display, and is configured to display the first data in a first display area in a first predetermined display mode associated with the first unique information, and to display the second data in a second display area in a second predetermined display mode associated with the second unique information.

2. The POS system described in claim 1, further comprising:
an external server configured to store display data,
wherein the display is configured to acquire the display data from the external server using the second data, and to display the display data instead of the second data in the second display area in a predetermined display mode associated with the second unique information.

3. The PUS system described in claim 2, wherein the second data includes a communication address of the external server.

4. A host device comprising:
a processor configured to receive, from a POS terminal, first data related to account processing and first unique information, send the first data and the first unique information to a display, receive, from the PUS terminal, second data not related to the account processing and second unique information, and send the second data and the second unique information to the display, and
a memory configured to store the first data in a first storage area associated with the first unique information, and store the second data in a second storage area associated with the second unique information, wherein:
the processor is configured to send the first data and the first unique information to the display by push transmission responsive to receiving the first data and the first unique information from the PUS terminal, and to send the second data and the second unique information to the display by push transmission responsive to receiving the second data and the second unique information from the PUS terminal, and
the first unique information is configured to make the display display the first data in a first display area in a first predetermined display mode, and the second unique information is configured to make the display display the second data in a second display area in a second predetermined display mode.

5. The host device described in claim 4, wherein the second data includes a communication address of an external server.

6. A host device control method comprising:
receiving, from a POS terminal, first data related to account processing and first unique information;
sending the first data and the first unique information to a display by push transmission;
receiving, from the POS terminal, second data not related to the account processing and second unique information;
sending the second data and the second unique information to the display by push transmission;
storing the first data in a first storage area associated with the first unique information; and
storing the second data in a second storage area associated with the second unique information, wherein:
the first unique information is configured to make the display display the first data in a first display area in a first predetermined display mode, and the second unique information is configured to make the display display the second data in a second display area in a second predetermined display mode.

7. The host device control method described in claim 6, wherein the second data includes a communication address of an external server.

* * * * *